United States Patent
Rohde et al.

(10) Patent No.: US 6,599,969 B1
(45) Date of Patent: Jul. 29, 2003

(54) PREPARATION OF POLYOLEFINS WITH LOW EXTRACTABLES CONTENTS

(75) Inventors: Wolfgang Rohde, Speyer (DE); Guido Funk, Worms (DE); Hans-Helmut Görtz, Freinsheim (DE); Rolf Osterloh, Grünstadt (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 08/804,665

(22) Filed: Feb. 25, 1997

Related U.S. Application Data

(63) Continuation of application No. 08/560,639, filed on Nov. 20, 1995, now abandoned.

(30) Foreign Application Priority Data

Nov. 26, 1994 (DE) ........................................ P 44 42 166

(51) Int. Cl.$^7$ ............................ C08K 5/13; C08K 5/134
(52) U.S. Cl. ................. 524/291; 525/327.9; 525/333.7; 525/384; 528/492; 528/496; 528/501; 528/502; 528/503; 524/336
(58) Field of Search .......................... 524/291; 528/503, 528/501, 502, 496, 492; 525/327.9, 333.7, 384, 336

(56) References Cited

U.S. PATENT DOCUMENTS

| | | | |
|---|---|---|---|
| 3,271,185 A | * | 9/1966 | Pollock ...................... 524/349 |
| 3,502,633 A | | 3/1970 | Schwaar et al. |
| 4,211,863 A | | 7/1980 | McDaniel et al. |
| 4,234,716 A | | 11/1980 | Cuypers et al. ............. 528/483 |
| 4,701,489 A | | 10/1987 | Hughes et al. .............. 524/349 |
| 4,769,429 A | * | 9/1988 | Furtek ...................... 526/124.5 |
| 4,803,259 A | * | 2/1989 | Zboril et al. ................. 528/492 |
| 5,039,765 A | * | 8/1991 | Saive et al. .................. 528/501 |
| 5,616,664 A | * | 4/1997 | Timmers et al. ............ 502/103 |
| 5,844,045 A | * | 12/1998 | Kolthammer et al. ....... 525/240 |

FOREIGN PATENT DOCUMENTS

EP 604 958 7/1994

OTHER PUBLICATIONS

U.S. Statutory Registration No. H860 Invention published Dec. 4, 1990 to Robert C. Job.

* cited by examiner

*Primary Examiner*—Peter Szekely
(74) *Attorney, Agent, or Firm*—Keil & Weinkauf

(57) ABSTRACT

A process for preparing stabilized olefin polymers which have a low cold heptane extractables content by polymerization of olefins with Ziegler or Phillips catalysts, wherein the polymer is, immediately after leaving the polymerization reactor, brought into contact with an involatile phenol derivative.

6 Claims, No Drawings

PREPARATION OF POLYOLEFINS WITH LOW EXTRACTABLES CONTENTS

This application is a continuation of application Ser. No. 08/560,639, filed on Nov. 20, 1995 now aband.

The present invention relates to a process for preparing stabilized olefin polymers which have a low cold heptane extractables content by polymerization of olefins with Ziegler or Phillips catalysts.

The invention also relates to the olefin polymers, to the use of the stabilized olefin polymers obtained in this way for producing fibers, sheets and moldings, and to the fibers, sheets and moldings obtainable thereby.

Olefin polymers, especially ethylene polymers, are widely used for producing sheets and moldings.

The olefin polymers used for this purpose are obtained in many cases by low-pressure polymerization of olefins in the presence of Ziegler or Phillips catalyst systems.

However, in this type of polymerization there may frequently be uncontrolled after-polymerization of the monomers outside the actual reaction zone, which generally leads to the formation of polymer lumps, deposits on the walls and tacky polymers which may block the discharge system of the polymerization plant and thus endanger economic, continuous operation.

In addition, the polymer fractions formed in the uncontrolled manner, which are often of low molecular weight and/or rich in comonomers, may contaminate the entire polymer and thus adversely affect its property profile.

The polymerization activity of Ziegler and Phillips catalysts can in general be destroyed by catalyst poisons.

U.S. Pat. No. 3,502,633 describes the use for this purpose of alcohols having 1 to 4 carbon atoms as catalyst poison in the discharge region of a polymerization plant.

U.S. Pat. No. 4,211,863 describes the use of carbon dioxide and other oxygen-containing catalyst poisons in the discharge region of a polymerization plant.

However, both processes have the disadvantage that the catalyst poisons used may get into the reactor, with the circulating gas which, inter alia, returns residual monomers from the discharge system to the reactor, and there likewise poison the polymerization catalyst. In order to prevent this, elaborate processes are generally needed to remove the catalyst poisons from the circulating gas.

U.S. H 860 describes the reversible deactivation of Ziegler catalyst systems by adding sterically hindered phenols to the polymerization reactor and subsequent reactivation of the catalyst system. However, this process has the disadvantage that the polymerization process in the reactor is repeatedly interrupted.

It is an object of the present invention to eliminate the above-mentioned disadvantages.

We have found that this object is achieved by a process for preparing stabilized olefin polymers which have a low cold heptane extractables content by polymerization of olefins with Ziegler or Phillips catalysts, wherein the olefin polymer is, immediately after leaving the polymerization reactor, brought into contact with an involatile phenol derivative.

We have also found the olefin polymers obtainable by the process according to the invention, and the use of the olefin polymers obtained in this way for producing fibers, sheets and moldings, and the fibers, sheets and moldings obtainable thereby.

The olefin polymers according to the invention are obtained by homo- or copolymerization of $C_2$–$C_{10}$-1-alkenes under low-pressure conditions. Suitable 1-alkenes are ethylene, propylene, 1-butene, 1-pentene, 1-hexene, 1-heptene, 1-octene, 1-nonene and 1-decene.

The olefin copolymers are generally prepared by copolymerizing two or more different 1-alkenes, with the ratio of the amounts of the monomers generally not being critical.

It is preferred to copolymerize ethylene and $C_3$–$C_{10}$-1-alkenes, in particular ethylene and 1-hexene.

The ethylene/1-alkene copolymers generally contain from 0.1 to 10 mol % of 1-alkene units, preferably 0.1 to 5 mol % and, in particular, 0.2 to 2 mol %.

The ethylene/1-hexene copolymers generally contain from 0.1 to 10 mol % of 1-hexene units, preferably 0.1 to 5 mol % and, in particular, 0.2 to 2 mol %.

The chemically bound comonomer content of the olefin polymers was determined by the $^{13}$C-NMR spectroscopy method of J. C. Randall et al., J. Macromol. Sci., Rev. Macromol. Chem. Phys. (1989, C 29 (⅔)).

The melt flow indices of the homo- and copolymers determined by the DIN 53735 method at 190° C. (loading weights in parentheses) are, as a rule, in the range from 0.1 g/10 min (21.6 kg) to 100 g/10 min (2.16 kg), preferably in the range from 2 g/10 min (21.6 kg) to 20 g/10 min (2.16 kg) and, in particular, in the range from 5 g/10 min (21.6 kg) to 10 g/10 min (2.16 kg).

Catalyst systems suitable for the polymerization are known to the skilled worker. For the sake of completeness, mention may be made here of catalyst systems obtained by combining one or more transition metal components and one or more activators, also called cocatalysts. They are referred to as Ziegler and metallocene catalysts. Also suitable for the process according to the invention are Phillips catalysts. Phillips catalysts are preferably used for ethylene homo- and copolymerizations.

The polymerization can be carried out in conventional reactors used for low-pressure polymerization of 1-alkenes, either batch-wise or, preferably, continuously, in suspension, solution, gas phase or in the liquid monomer. Ethylene polymerizations are preferably carried out in suspension or in the gas phase.

The polymerization temperatures are generally in the range from 30 to 140° C., preferably in the range from 50 to 110° C. and, in particular, in the range from 70 to 100° C.

The polymerizations are generally carried out under a pressure in the range from 100 to 10000 kPa, preferably in the range from 1000 to 6000 kPa and, in particular, in the range from 2000 to 4000 kPa.

The volatility of the phenol derivative is indicated here by its boiling point and its molecular weight. As a rule there is assumed to be an inverse proportionality between volatility and boiling point or volatility and molecular weight.

The boiling point of the phenol derivative in the process according to the invention is, measured at or extrapolated to 100 kPa, not less than 270° C., preferably not less than 280° C. and, in particular, not less than 290° C.

The molecular weight of the phenol derivative according to the invention is preferably not less than 250. It is particularly preferably in the range from 300 to 3000 and, in particular, in the range from 350 to 2500.

There are no special requirements to be met by the phenol derivative according to the invention in respect of chemical structure.

Suitable representatives are sterically hindered phenols, ie. those with large, usually branched substituents in the vicinity of the phenolic hydroxyl group. These may be organic groups based on C, Si or other elements, or halogen atoms. Particularly suitable representatives are the derivatives of 2,6-di-tert-butylphenol. One or more of these o,o- di-tert-butylphenol structural unit(s) may additionally be linked in a variety of ways to other organic structural units.

Examples of particularly suitable representatives of this class of compounds are pentaerythrityl tetrakis[3-(3,5-di-tert-butyl-4-hydroxyphenyl) propionate] (I), commercially available as Irganox® 1010, octadecyl 3-(3,5-di-tert-butyl-4-hydroxyphenyl) propionate (II), commercially available as Irganox® 1076, and 4,4,4"-[(2,4,6-trimethyl-1,3,5-benzenetriyl)tris(methylene)]-tris[2,6-bis(1,1-dimethylethyl) phenol] (III), commercially available as Irganox® 1330.

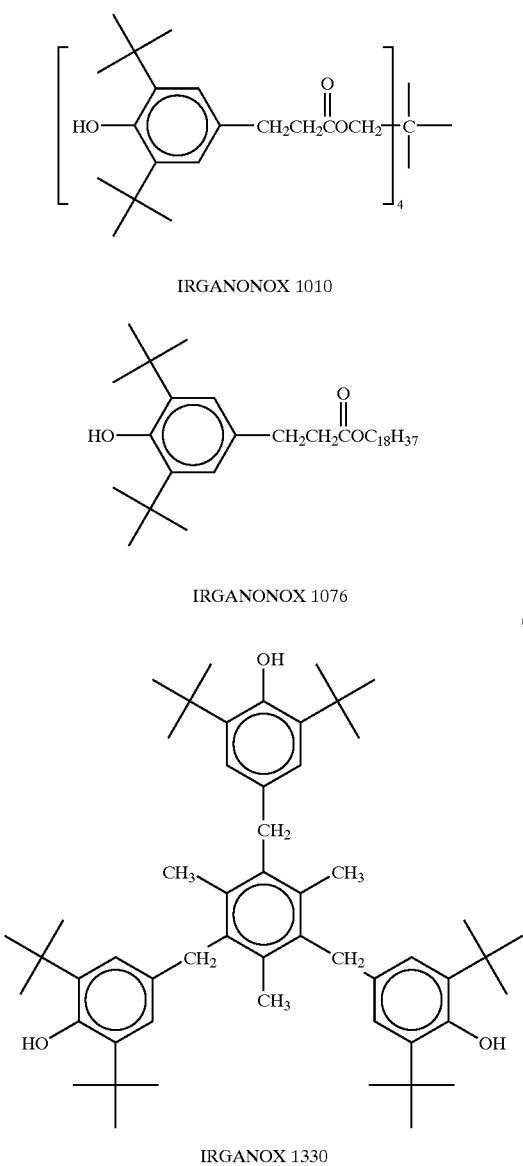

Particularly suitable phenol derivatives are used as antioxidants for polyolefins.

The phenol derivative is preferably used as solution in a solvent which is substantially inert toward the constituents of the polymerization reaction mixture. Suitable solvents are aromatic and aliphatic hydrocarbons, for example toluene, ethylbenzene, hexane, heptane or mixtures of these hydrocarbons.

The concentration of the phenol derivative in these solutions is from 0.01 to 10 M, preferably 0.05 to 1 M.

It is essential to the invention that the phenol derivative is metered in as early as possible after the polymerization mixture has left the reactor.

The metering point for the phenol derivative in the process according to the invention is therefore expediently located between the product discharge valve of the polymerization reactor and the first decompression tank for the polymerization mixture, it being possible for the metering point to be attached both to the product discharge valve and to the decompression tank itself.

It is particularly advantageous for the phenol derivative to be metered into the decompression tank. This decompression tank is advantageously located about 5 to 20 m in a product downstream direction from the reactor.

The time spent by a reference fraction of the stream of polymerization mixture in the zone between the reactor discharge valve and the metering point for the phenol derivative according to the invention is in the range from 0.01 to 5000 s; preferably in the range from 0.1 to 1000 s and, in particular, in the range from 0.1 to 100 s.

The pressure prevailing in the zone into which the phenol derivative is metered is in the general range from 100 to 2000 kPa, preferably in the range from 100 to 1000 kPa and, in particular, in the range from 100 to 500 kPa and is, in general, less than the pressure prevailing in the polymerization reactor itself.

The amount of phenol derivative metered in based on the calculated amount of catalyst solid, measured in mol of phenol derivative per kg of catalyst solid, is generally in the range from 0.01 to 10 mol/kg, preferably from 0.02 to 5 mol/kg and, in particular, from 0.05 to 3 mol/kg.

The term phenol derivative is not confined just to a certain chemical compound. It is, of course, possible to use a mixture of several phenol derivatives in the process according to the invention.

In the process according to the invention, the uncontrolled after-polymerization of monomers in the discharge system of the polymerization plant is virtually suppressed without interfering with the polymerization reaction in the reator itself. The deactivation reaction takes place relatively fast.

The olefin polymers obtainable by the process according to the invention now contain, which could not have been predicted, only low cold heptane extractables contents.

These contents, called CHE hereinafter, are determined by extracting a defined amount of olefin polymer in granular form with heptane at 23° C. for 120 minutes and subsequently evaporating the heptane from the extract and drying the residue at 100° C. to constant weight. The residue is weighed and its content is calculated in % of the weight of the olefin polymer used.

The cold heptane extractables in the olefin polymer determined in this way are in the range from 0.0 to 2.0% by weight, and preferably in the range from 0.0 to 1.0% by weight.

Because of these low cold heptane extractables contents, the olefin polymers obtainable by the process according to the invention are particularly for producing sheets and moldings for the packaging sector.

EXAMPLES

Example 1

500 ml of isobutane as suspending agent and 20 ml of 1-hexene were introduced into a 1 l steel autoclave. Then, at 90° C., ethylene was injected to a total pressure of 3000 kPa, and subsequently 81 mg of a Phillips catalyst as described in DE-A 25 40 279 (example) were metered in. Polymerization was then carried out for 55 min. The pressure in the autoclave was then reduced to 200 kPa, after which 2 ml of a 0.1 M solution of octadecyl 3-(3,5-di-tert-butyl-4-hydroxyphenyl)propionate (II) in heptane were metered into the contents of the autoclave, and 1 h was allowed to elapse. After this, the copolymer (55 g) was discharged into the air and, subsequently the cold heptane extractables content was determined. In this experiment it was 0.69% by weight. The copolymer contained 1.6 mol % of units derived from 1-hexene. The autoclave contained no deposits of polyolefin on the internal walls.

Example 2

The procedure was as in Example1 but no phenol derivative was added. The cold heptane extractables content of the copolymer was now 3.12% by weight, and deposits of polyolefin were evident on the internal walls of the autoclave.

We claim:

1. A process for preparing stabilized olefin polymers which have a cold heptane extractables content in the range of from 0.0 to 2.0% by weight by the polymerization of olefins with Phillips catalysts, wherein the olefin polymer is, immediately after leaving the polymerization reactor, brought in to contact with a phenol derivative having at least one free hydroxy group, a boiling point above 270° C. measured under 100 kPa and a molecular weight not less than 250 wherein the pressure prevailing in the zone into which the phenol derivative is metered is in the range of from 100 to 2,000 kPa and the phenol derivative is present in a solvent which is substantially inert toward the constituents of the polymerization reaction mixture.

2. A process as claimed in claim 1, wherein the phenol derivative is a derivative of 2,6-di-tert-butylphenol.

3. An olefin polymer obtained by the process of claim 1.

4. A fiber, sheet or molding formed from the olefin polymers obtained as defined in claim 1 as essential component.

5. The process as defined in claim 2 wherein the phenol derivative is of the formula (I)

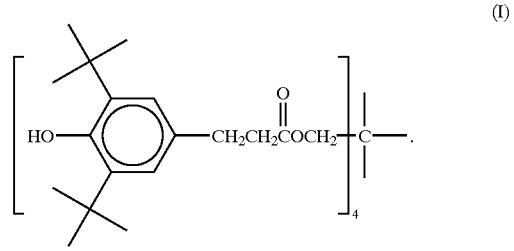

(I)

6. The process as defined in claim 2 wherein the phenol derivative is of the formula (II)

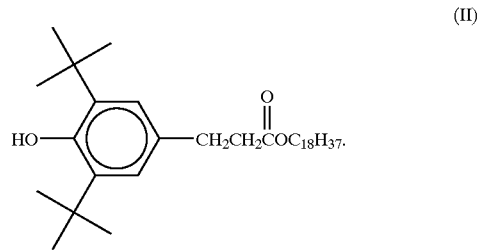

(II)

* * * * *

UNITED STATES PATENT AND TRADEMARK OFFICE
CERTIFICATE OF CORRECTION

PATENT NO.     : 6,599,969 B1
DATED          : July 29, 2003
INVENTOR(S)    : Rohde et al.

It is certified that error appears in the above-identified patent and that said Letters Patent is hereby corrected as shown below:

Column 5,
Line 33, "A process as claimed" should be -- The process as defined --.

Signed and Sealed this

Eleventh Day of November, 2003

JAMES E. ROGAN
*Director of the United States Patent and Trademark Office*